US009552049B1

(12) United States Patent
Butler et al.

(10) Patent No.: US 9,552,049 B1
(45) Date of Patent: Jan. 24, 2017

(54) ACTIVATING AND USING DEVICE WITH A GRIP SWITCH

(71) Applicant: AMAZON TECHNOLOGIES, INC., Reno, NV (US)

(72) Inventors: David George Butler, San Jose, CA (US); Richard William Mincher, Cupertino, CA (US)

(73) Assignee: Amazon Technologies, Inc., Reno, NV (US)

( * ) Notice: Subject to any disclaimer, the term of this patent is extended or adjusted under 35 U.S.C. 154(b) by 64 days.

(21) Appl. No.: 14/037,140

(22) Filed: Sep. 25, 2013

(51) Int. Cl.
G06F 3/033 (2013.01)
G06F 1/32 (2006.01)

(52) U.S. Cl.
CPC .................... *G06F 1/3259* (2013.01)

(58) Field of Classification Search
CPC .. G06F 3/03545; G06F 3/0354; G06F 3/0317; G01S 5/18
USPC ......................................................... 345/179
See application file for complete search history.

(56) References Cited

U.S. PATENT DOCUMENTS

| 6,259,438 | B1 * | 7/2001 | Fleck et al. .................... 345/184 |
| 6,703,570 | B1 * | 3/2004 | Russell ..................... G01S 5/18 |
| | | | 178/18.01 |
| 8,803,850 | B2 * | 8/2014 | Griffin et al. ................. 345/179 |
| 2003/0076310 | A1 * | 4/2003 | Kanzaki et al. .............. 345/179 |
| 2010/0248822 | A1 * | 9/2010 | Migos et al. ................. 340/5.82 |
| 2012/0192250 | A1 * | 7/2012 | Rakan ............................... 726/2 |
| 2013/0106715 | A1 * | 5/2013 | Shahparnia et al. .......... 345/173 |

* cited by examiner

Primary Examiner — Towfiq Elahi
(74) Attorney, Agent, or Firm — Lindauer Law, PLLC

(57) ABSTRACT

An activation signal is provided in response to a user gripping force incident to a grip switch. Electronic circuitry transitions from an inactive state to an active state in response to the activation signal. The activation signal may also include encoded information regarding user identity, gripping force magnitude, user input gesturing, and the like. The electronic circuitry may use the information encoded in the signal to select or perform particular functions or operations. Power consumption of a stylus, user device, or other apparatus is reduced, or various functions are improved, accordingly.

20 Claims, 9 Drawing Sheets

ACTIVATING AND USING DEVICE WITH A GRIP SWITCH

BACKGROUND

Various electronic devices are used in countless areas of endeavor. Many such devices are built as portable, battery-powered units. Users seek to reduce energy consumption, extend battery life, improve user convenience, or enhance operation with respect to various devices.

Figure 1:
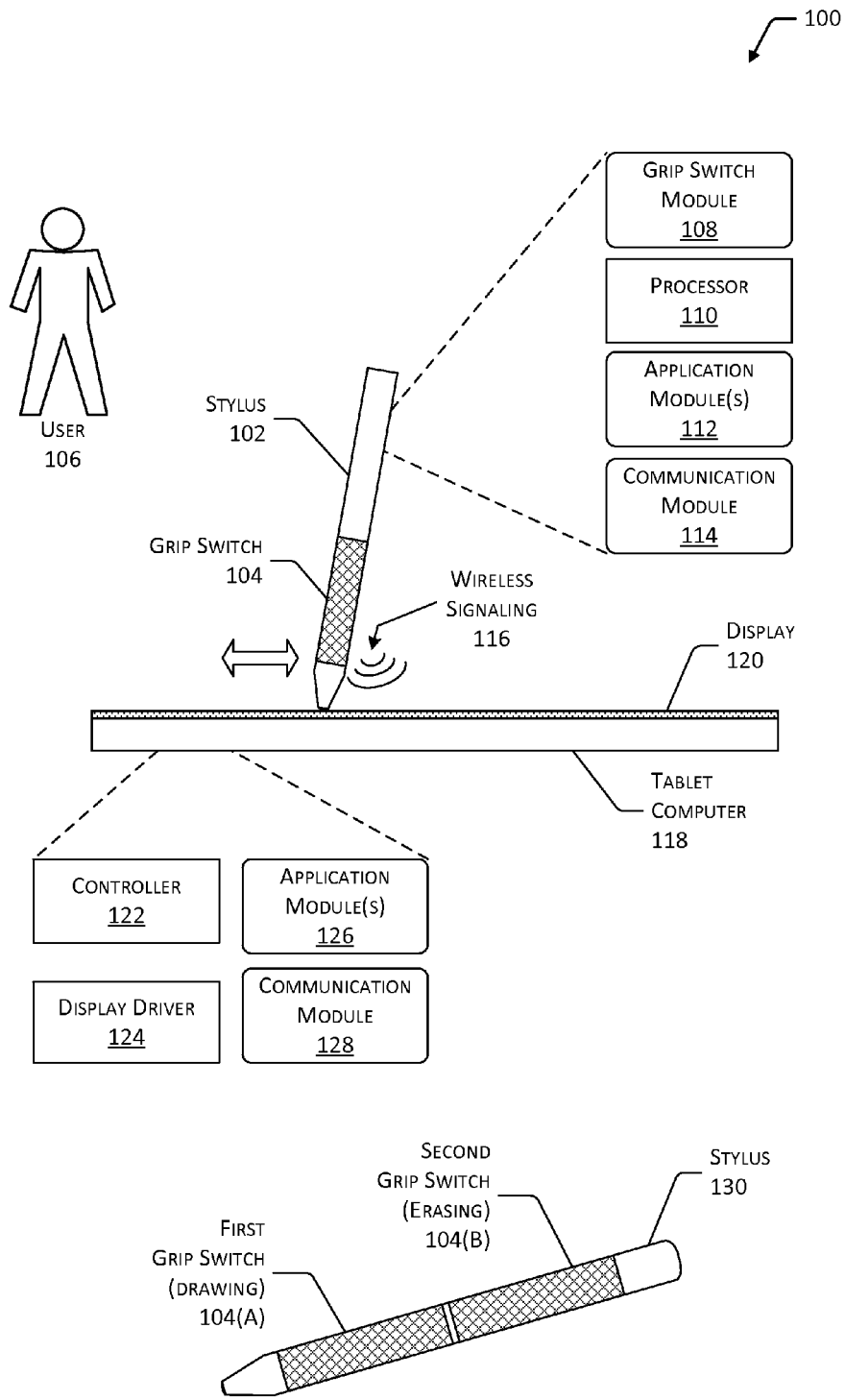
FIG. 1 illustrates one implementation of a stylus configured to be actuated and used based on a user gripping of a grip switch.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

Users employ a wide range of electronic devices for many purposes. In many instances, such devices are designed with handheld, portable form-factors and operate by way of rechargeable or disposable batteries. Cellular telephones, stylus for use with tablet computers, media access or viewing devices, and the like are just a few examples. In other instances, a device or feature is part of a larger or more complex system such as an aircraft, an industrial process, and the like. Various aspects of these devices or apparatus are held or gripped in the hand of user during operation.

Power conservation is a concern with respect to battery-powered devices, so as to extend useable life before recharging or battery replacement. Thus, it is desirable to prevent or reduce electrical power consumption when the particular device is not in use. In another situation, an operator is required to remain at a duty station and maintain control of a vehicle, supervise a manufacturing process, or other scenario. An alarm is sounded or other actions are taken in the event that the operator is absent or becomes incapacitated, and so on.

Grip switches are used to provide an electrical signal in response to a gripping force applied by a user. For instance, such a gripping force may be applied by the palm of a user's hand while grasping the grip switch or an associated device bearing the grip switch, by squeezing the grip switch between the thumb and forefinger of the user's hand, or by way of another manual engagement of the user's hand with the grip switch. Such grip switches may be configured in various ways and may exhibit contact between respective electrodes or contacts, varying resistance or voltage, or another electrical characteristic that is indicative of a user grasping the grip switch.

One or more grip switches may be provided by and supported on a particular device. Alternatively, an accessory may be configured for usage with a given user device, wherein the accessory includes one or more grip switches. A device may transition between inactive and active modes, perform predefined operations, or trigger other functions in response to signaling from such a grip switch or switches.

In one example, a stylus is configured for use with a tablet computer. A grip switch and associated circuitry provide an activation signal in response to a user gripping the stylus. A processor of the stylus transitions from an inactive, low-power state to an active, higher-power state in response to the activation signal. The stylus is used to communicate motion, position, or other information to the tablet computer in accordance with normal usage. Thereafter, the user sets the stylus aside such that the grip switch is no longer activated. The processor or other resources of the stylus may then resume the low-power, inactive state in the interest of battery power conservation or other concerns.

In another instance, a cellular telephone includes two grip switches disposed on opposite sides. Grasping of the cellular telephone in a user's hand causes the grip switches to provide respective activation signals. A controller, processor, or other resource of the cellular telephone assumes an active state in response to one or both activation signals, presenting a predefined or user-configurable user interface on a display. The cellular telephone is now ready for placing a call or some other use. Thus, the cellular telephone has been activated or "awakened" simply by grasping it in the hand and without specific actuation of an on/off switch, swiping or other gesturing input to the display, and so forth. User convenience and immediacy of operation are therefore improved.

In still another example, an accessory for a media device includes a grip switch on a side surface. The accessory is formed using a resilient material and is configured to removably engage—that is, to be installed on—the media device in a close-fitting, jacket-like relationship. Electrical contacts borne on an inside surface of the accessory connect with corresponding contacts borne by the media device so that signals from the grip switch can be communicated thereto. The media device may assume an active state, trigger various operations, and so on in response to a user grasping or holding the media device as detected by the grip switch. Additionally, the media device may assume an inactive, power-conserving state sometime after being set down by the user or in response to another detected or triggering event.

The foregoing examples are illustrative and non-limiting in nature. Grip switches or related sensing devices exhibit respective electrical characteristics that change in response to a user applied gripping or holding force. Circuitry connected to a grip switch asserts an activation signal, modulates a voltage, digitally encodes a value within a range, or provides other information indicative of a gripped condition of, or user force input to, the grip switch.

A device or apparatus may be triggered from a low-power state to an activated state, select or perform one or more predetermined operations, and so forth, in response to such an activation signal. The device or apparatus may also be returned to the inactive, low-power state in response to a change in or un-assertion of the activation signal, or in response to an idle state of predetermined duration such as detected by an accelerometer and timer, or in accordance with other control strategies. Battery-based energy resources may be conserved, and user convenience and overall experience are improved accordingly. Respective variations on the foregoing may also be used in accordance with the methods, devices and systems described herein.

FIG. 1 depicts views 100 including a stylus 102. The views 100 include particular elements and operations performed by each. The views 100 are illustrative and non-limiting in nature, and other elements, devices, systems or respective operations are also contemplated.

A stylus 102 includes a grip switch 104. The grip switch 104 is configured to exhibit a change in an electrical characteristic in response to a gripping or holding force input from a user 106. The grip switch 104 is further configured to exhibit this electrical characteristic change when the stylus 102 is held in the hand of a user 106 during normal use.

The stylus 102 also includes a grip switch module 108 that senses or detects the electrical characteristic of the grip switch 104 and provides or encodes a corresponding signal output. The grip switch module 108 may include electronic circuitry, a dedicated-purpose integrated circuit, an accelerometer, a timer, an analog-to-digital converter (ADC), a processor or microcontroller, executable program code stored on computer-readable storage media (CRSM), or other constituency. The grip switch module 108 may sense, detect, or measure the instantaneous state or value of the electrical characteristic of the grip switch 104 using a biasing signal, such as a direct current or voltage. The grip switch module 108 may also filter or otherwise process such a biasing signal, as well. Other sensing or detecting techniques may also be used.

A "digital signal" refers to an electrical signal that is modulated or varied so as to convey information by way of two or more discrete values. For example, a digital signal may be characterized by two distinct voltage levels corresponding to "one" and "zero", respectively. In another example, a digital signal may be characterized by a carrier wave that is modulated at a plurality of different frequencies, wherein each frequency corresponds to a predefined data value. Other digital signaling formats or characteristics may also be used.

The grip switch module 108 may also include debounce circuitry or similar functionality, may perform various types of signal filtering in accordance with sensed changes in the electrical characteristic of the grip switch 104, and so forth. In one instance, the grip switch module 108 is configured to provide or assert a signal output after the grip switch 104 has been grasped for a predetermined period of time. In another instance, the grip switch module 108 provides or encodes an output signal in accordance with comparing the changing electrical characteristic of the grip switch 104 with a predetermined threshold or value. Furthermore, the grip switch module 108 may provide or output an analog signal or a digital signal, or may provide an output signal including digitally encoded information or data. The grip switch module 108 may provide other signals or signal content, as well.

The stylus 102 also includes a processor 110. The processor 110 may include a microprocessor, a microcontroller, or other device configured to perform or control various respective operations of the stylus 102 in accordance with an executable program code. The processor 110 is also configured to receive signaling from the grip switch module 108, which may cause the processor 110 to transition from an inactive, low-power mode to an active, higher-power mode, perform one or more predetermined operations, and so forth.

The stylus 102 also includes one or more application modules 112. Each application module 112 may include program code stored on non-transitory CRSM, electronic circuitry, or other resources such that the stylus 102 may perform various respective functions. In one instance, the application modules 112 include program code that is executable by the processor 110. Other configurations may also be used.

The stylus 102 further includes a communications module 114. The communications module 114 may include electronic circuitry or other resources, and is configured to communicate information, data, signals, and so forth, to and from the stylus 102 using wireless signaling 116. In one example, one of the application modules 112 is configured to operate, in cooperation with the processor 110, such that position, movement, velocity, orientation, or other information regarding the stylus 102 is communicated by way of the wireless signaling 116. Other various operations may also be performed.

A tablet computer 118 is also provided. The tablet computer 118 includes a display 120 configured to present text, computer-generated images, digital photographs, video segments, indicia, and other visual content to the user 106. The tablet computer 118 also includes a controller 122 configured to control or perform various operations in accordance with an executable program code. The controller 122 may include one or more processors or microcontrollers, electronic circuitry, an application-specific integrated circuit (ASIC), and so forth.

The tablet computer 118 also includes a display driver 124. The display driver 124 is configured to cause text, images, and so on to be presented on the display 120 in accordance with control or data signaling received from the controller 122. The display driver 124 may include electronic circuitry, dedicated-purposes devices, or other resources.

The tablet computer 118 also includes one or more application modules 126 configured such that the various and respective operations and functions may be performed. Non-limiting examples of the application modules 126 include e-book readers, photographic viewing or editing applications, a word processing application, a web browser, and so forth. The application modules 126 may respectively include executable program code, electronic circuitry, sensors or input/output devices, and so on.

The tablet computer 118 also includes a communication module 128 configured to communicate information, data, and so forth between the tablet computer 118 and the stylus 102 by way of the wireless signaling 116. For example, the communication module 128 may comprise a transceiver (transmitter and receiver) compatible with one or more wireless protocols such as Wi-Fi®, Bluetooth®, ZigBee®, and so forth. In other implementations the communication module 128 may comprise a transmitter only. The communication module 128 may be configured to communicate with other computing devices, with various network or web-based resources, and so on.

In one illustrative and non-limiting operation, the user 106 grasps the stylus 102 in the hand such that respective electrodes within the grip switch 104 make electrical contact. For example, electrical contact occurs when the respective electrodes come into physical contact with at least a portion of one another such that an electrical connection, or electrically conductive pathway, between the two is established. The electrical connection allows for the transfer of electrical charge. In one implementation one or more of the respective electrodes may comprise an electrically conductive material which may be deformed or displaced to make electrical contact with another portion of electrically conductive material. The grip switch module 108 senses the contacting electrodes and provides an activation signal to the processor 110. In some implementations the grip switch module 108 may sense additional kinds of electrical coupling between the electrodes 202 and 204, including but not limited to, inductive coupling, capacitive coupling, or magnetic coupling. For example, a displacement one or both of the electrodes 202-204 may alter the capacitive coupling between the two, which may be detected by the grip switch module 108. The activation signal may be provided, for instance, to a general purpose input/output (GPIO) of the processor 110. Other signal provision or reception techniques may also be used.

The processor 110 responds to the activation signal from the grip switch module 108 by transitioning from a power-conserving, inactive state to a higher-power, active state. The processor 110 then signals other resources of the stylus 102 to assume similar active states, as well. For instance, the processor 110 may access an application module 112, or signal the communications module 114 to assume an active state from an inactive state. Other operations or resource activations may also be performed.

The processor 110 may thereafter use an application module 112 so as to generate positioning or motion data corresponding to the user 106 moving the stylus 102 about in contact with the display 120. The processor 110 provides this data to the communication module 114, which encodes and sends the data to the tablet computer 118 using the wireless signaling 116. The tablet computer 118 responds to the data communication by presenting lines, arcs, or other indication on the display 120 in accordance with the motion of the stylus 102. For example, the user 106 may be highlighting a hiking route on an image of a map presented on the display 120.

Thereafter, the user 106 sets the stylus 102 aside such that the grip switch 104 is no longer being grasped. The electrodes within the grip switch 104 break electrical contact with each other in response to the absence of the gripping force of the user 106. The grip switch module 108 un-asserts, or otherwise changes, the activation signal provided to the processor 110 to indicate the un-grasped or idle condition of the stylus 102.

The processor 110 responds to the ceased or changed condition of the activation signal by shutting down the application module 112, signaling the communications module 114 to resume the inactive state, or perform other operations in the interest of power conservation. The processor 110 then resumes the inactive state, until such time as the stylus 102 is reactivated in response to being grasped by the user 106.

The stylus 102 includes a single grip switch 104. That is, the stylus 102 may be configured to be activated, to perform one or more predetermined operations, and so on, based on signaling derived from the grip switch 104. However, it may be desirable to switch between different operating modes based upon the user 106 grasping different portions of a stylus or other device.

Also depicted is a stylus 130. The stylus 130 may be analogous to the stylus 102 and may be similarly resourced including the processor 110, one or more application modules 112, the communications module 114, and so forth. The stylus 130 also includes a first grip switch 104(A) disposed proximate to a lower or "writing" end, and a second grip switch 104(B) disposed proximate to an upper or "erasing" end of the stylus 130.

In one instance, the user 106 may grasp the stylus 130 by way of the first grip switch 104(A). Signaling derived from the first grip switch 104(A) may be used to activate the processor 110 and other resources of the stylus 130. Additionally, the stylus 130 may communicate wireless signaling 116 to the tablet computer 118 so as to activate a line tracing application module 126. Line segments, arcs, and so on appear on the display 120 in accordance with the user 106 movement of the stylus 130. That is, the user 106 moves the stylus 130 with the "writing" end in contact with the display 120 during the line tracing or drawing operation.

In another instance, the user 106 wishes to erase some of the lines just drawn during the illustrative operation above. The user 106 then turns the stylus 130 over, transitioning their grasp from the first grip switch 104(A) to the second grip switch 104(B). Thus, the first grip switch 104(A) changes its electrical state in accordance with the un-gripped condition, while the second grip switch 104(B) changes its electrical state in response to the gripped condition.

Signaling derived from the second grip switch 104(B) causes the stylus 130 to communicate wireless signaling 116 to the tablet computer 118 so as to activate an erasing application module 126. Lines, arcs, or portions thereof, are now deleted from the display 120 in accordance with user 106 movement of the stylus 130. Specifically, the user 106 moves the stylus 130 with the "erasing" end in contact with the display 120 during the line deletion operation.

Thus, the stylus 130 mimics the operation of a conventional lead pencil, with the user 106 grasping a grip switch 104(A) at a pointed end while drawing, and grasping a grip switch 104(B) at a blunted end while erasing. Other operations may be activated, or their characteristics selected or modulated, in response to the user 106 grasping a particular grip switch 104, adjusting the intensity of their grip, and so on. In another instance, the user 106 may step through, or select from, a plurality of different functions of the stylus 102 or 130 by applying a sequence of squeeze-like force inputs. That is, a grip-based "gesturing" system may be defined and used by way of a grip switch 104. Other techniques or functional selections may also be used.

Figure 2:
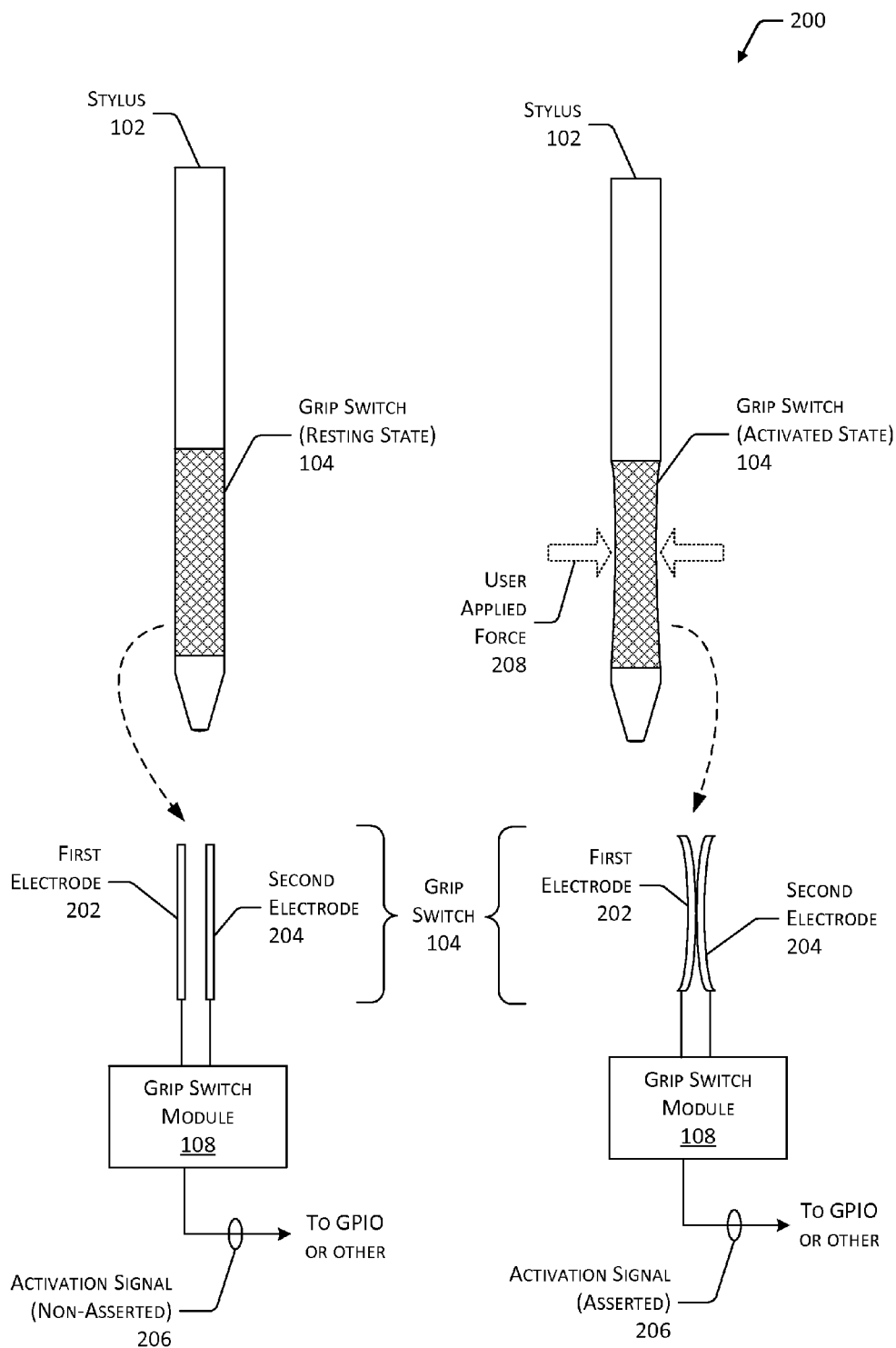
FIG. 2 illustrates a stylus in respective resting and actuated states based on user force input to a grip switch according to one implementation.

FIG. 2 depicts views 200 of the stylus 102 and respective elements thereof according to one implementation. The views 200 are illustrative and non-limiting in nature. Other implementations and variations may also be used.

In a first illustration, the grip switch 104 of the stylus 102 is depicted in a resting state. That is, the user 106 is not grasping the grip switch 104. Accordingly, a first electrode 202 and a second electrode 204 of the grip switch 104 are arranged in a non-contacting condition in which space is maintained between the first electrode 202 and the second electrode 204 such that electrical contact is not maintained. The grip switch module 108 is configured to electrically sense the non-contacting condition of the electrodes 202-204 by way of an electrical bias voltage. For example, the electrical bias voltage may be applied to one of the electrodes 202 or 204, such that when electrical contact between the electrodes 202 and 204 occurs, electrical current flows.

No electrical current passes through the electrodes 202 and 204 as a result of the non-contacting condition. For example, while in the non-contacting condition a gap, comprising a dielectric material such as ambient air between the electrodes 202 and 204, inhibits flow of electrical current. The grip switch module 108 does not assert an activation signal 206 in response to the sensed open condition of the electrodes 202 and 204.

In a second illustration, the user 106 grasps the stylus 102 such that a user applied force 208 is incident upon the grip switch 104. The first electrode 202 and the second electrode 204 are now flexed into a closed condition, such that the electrodes 202 and 204 are in physical and electrical contact with each other. The grip switch module 108 senses the closed condition of the electrodes 202 and 204, and asserts the activation signal 206 in response. For example, the grip switch module 108 may detect the presence of the electrical bias voltage across the electrodes 202 and 204. When the applied force is removed, such as when the user 106 releases their grip, the electrodes 202 and 204 to return to the open, non-contacting condition as depicted in the first illustration.

Thus, switching back and forth between electrically contacting and non-contacting states is readily achieved by a user 106 applying and releasing the user applied force 208 to the grip switch 104. The first and second electrodes 202 and 204, respectively, are depicted as flexible metallic elements in the interest of clarity of concept. However, numerous specific configurations may be used to detect the user 106 gripping or squeezing of a corresponding grip switch 104.

In one instance, the grip switch module 108 asserts the activation signal 206 continuously during a closed condition of the electrodes 202 and 204, wherein the activation signal 206 is otherwise not asserted. Such a "continuous-during-make" activation signal 206 may be used to convey operating power to the processor 110 or to other electronic constituency, for example. In another instance, the grip switch module 108 provides the activation signal 206 as a brief pulse at the instant of closure of the electrodes 202 and 204, such that the activation signal 206 is not continuously asserted thereafter.

In still another instance, grip switch module 108 encodes information within the activation signal 206 coincident with making contact between the electrodes 202 and 204, and then encodes other information coincident with breaking contact between the electrodes 202 and 204. Thus, the activation signal 206 may be provided as a continuous signal, a discontinuous signal, as an encoded information signal, or in other suitable ways. Digital, analog, or other activation signal 206 formats or protocols may be used.

Figure 3:
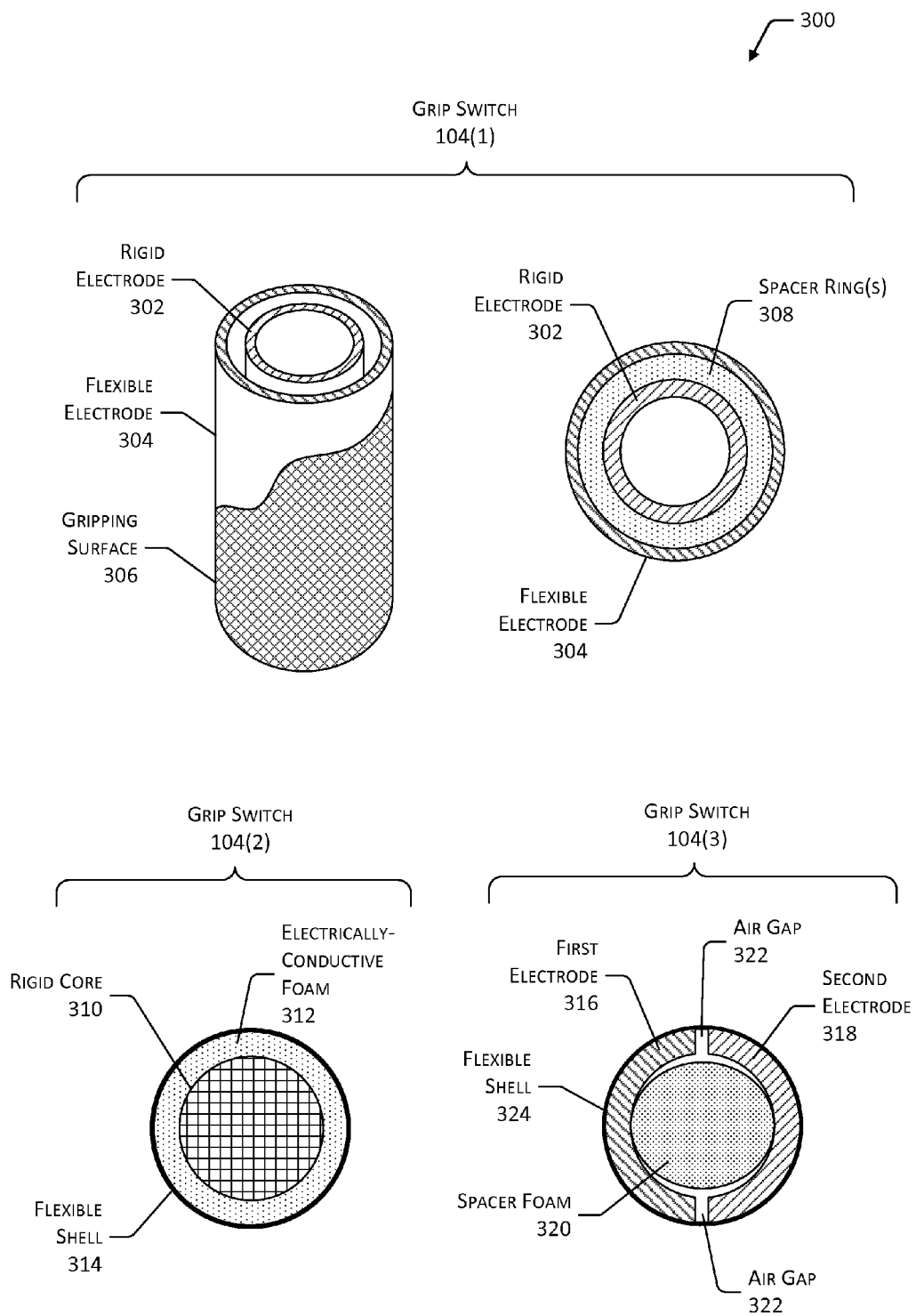
FIG. 3 illustrates grip switches according to three respective and non-limiting implementations.

FIG. 3 depicts views 300 of various grip switches 104 according to respective implementations. The views 300 are illustrative and non-limiting in nature. Other implementations and variations may also be used.

In one example, a grip switch 104(1) includes a rigid electrode 302. The rigid electrode 302 may be formed from aluminum, copper, or another conductive material. In another implementation, the rigid electrode 302 is formed by deposition of a layer of metal or other conductive material over a rigid substrate such as plastic or nylon. Other configurations may be used. As depicted, the rigid electrode 302 has a tubular or hollow cylindrical form-factor. The rigid electrode 302 is stiff and non-flexible in character so as to retain its shape under gripping force applied by a user 106. Solid electrodes, or electrodes having other cross-sectional shapes of form-factors, may also be used.

The grip switch 104(1) also includes a flexible electrode 304. The flexible electrode 304 may be formed from thin aluminum, copper, or another conductive material. In another instance, the flexible electrode 304 is formed by deposition of a layer of metal or other conductive material over a flexible sheet material such as plastic or nylon. Other configurations may be used. The flexible electrode 304 has a tubular or hollow cylindrical form-factor and is disposed in a concentric relationship with the rigid electrode 302. This concentric relationship may, or may not, be coaxial in that the rigid electrode 302 and the flexible electrode 304 may or may not share a common axis. In cross section, the rigid electrode 302, the flexible electrode 304, or both, may be circular as illustrated in this figure, or may be square, elliptical, irregular, asymmetrical, and so forth.

The flexible electrode 304 is configured to make resilient, electrically conductive contact with the rigid electrode 302 under the influence of the user applied force 208—that is, a gripping or squeezing action. The flexible electrode 304 is further configured to return to its resting state or base form, out of electrical contact with the rigid electrode 302, in the absence of the user applied force 208. The grip switch 104(1) also includes a gripping surface 306 disposed over the outside surface of the flexible electrode 304. The gripping surface 306 may be formed from synthetic rubber or another high-friction, resilient material.

The grip switch 104(1) further includes one or more spacer rings 308 or other spacer structures. Each spacer ring 308 or structure is formed from an electrically non-conductive material such as plastic, and is configured to maintain the flexible electrode 304 in a centered, spaced concentric relationship to the rigid electrode 302. The concentric relationship may be such that the flexible electrode 304 is arranged such that the rigid electrode 302 coaxial or centered within. In another implementation, the rigid electrode 302 may be off-center relative to the flexible electrode 304. The respective spacer rings 308 may be disposed at intervals along an axial or length-wise aspect of the rigid electrode 302. In one instance, a total of two spacer rings 308 are disposed proximate to opposite ends of the grip switch 104(1), such that electrical contact between the electrodes 302 and 304 is made near a mid-point there between during user 106 actuation. Other suitable configurations may be used.

The rigid electrode 302 and the flexible electrode 304 may be connected to the grip switch module 108 by way of respective lead wires or flexible electrical conductors. The grip switch module 108 may be configured to assert or not assert the activation signal 206 in accordance with a contacting or non-contacting state of the electrodes 302 and 304. Thus, the activation signal 206 may communicate on/off signaling based on the presence or absence of the user applied force 208.

In another example, a grip switch 104(2) is depicted in end section view and includes a rigid core 310. The rigid core 310 may be formed from plastic, nylon, or another electrically non-conductive material. In another implementation, the rigid core 310 is formed from metal or another electrically conductive material and maintains electrical connection with an electrically-conductive foam 312 or other material, such as a conductive polymer. Other configurations and materials may also be used.

The grip switch 104(2) also includes the electrically-conductive foam 312 introduced above. The electrically-conductive foam 312 is disposed about and supported by the rigid core 310. The electrically-conductive foam 312 is characterized by an electrical resistance or "Ohmic" value that varies in accordance with a squeezing force applied by the user 106. In one instance, the electrical resistance of the electrically-conductive foam 312 decreases in response to an increase in the user applied force 208. Other materials such as conductive polymers, piezoelectric materials, and so forth may also be used. Additionally, other electrical characteristics may also be used. The electrically-conductive foam 312 or other material may also resilient in nature and returns to a resting form or state in the absence of the user applied force 208.

The grip switch 104(2) includes a flexible shell 314 disposed about the electrically-conductive foam 312. The flexible shell 314 may be formed from synthetic rubber or the like, so as to provide the non-slip gripping surface 306. In another instance, the flexible shell 314 is formed from plastic or another compliant sheet material. In some cases, where the flexible shell 314 is formed from electrically non-conductive material, a metallic layer may be deposited or applied to an inside surface so as to maintain electrical connection with the electrically-conductive foam 312. Other configurations may also be used.

The grip switch module 108 may be electrically connected to the electrically-conductive foam 312 by way of the rigid core 310 and the flexible shell 314, or by way of other suitable conductive lead wires or the like. The grip switch module 108 may also be configured to provide or assert an activation signal 206 when the electrical resistance exhibited by the electrically-conductive foam 312 is lesser than a threshold value, thus providing an on/off type signal.

In another case, the grip switch module 108 may be configured to modulate a voltage of the activation signal 206 in accordance with the instantaneous resistance of the electrically-conductive foam 312. In still another case, the grip switch module 108 may be configured to digitally encode a value within the activation signal 206 in accordance with the instantaneous resistance of the electrically-conductive foam 312. These and other configurations may be used so as to communicate a magnitude of the user applied force 208, communicate the identity of a particular user 106 based on the user applied force 208, and so forth. Other indications or information may be determined and communicated from the grip switch module 108 to the processor 110 based on the sensed resistance value of the electrically-conductive foam 312.

In still another example, a grip switch 104(3) is depicted in end section view and includes a first electrode 316. The first electrode 316 may be formed from metal or another electrically conductive material. The first electrode 316 is characterized by a channel-like or "C" shaped cross-section. A second electrode 318 is also included, and is characterized by the same or a similar cross-sectional shape as that of the first electrode 316. The second electrode 318 is disposed in mirror-image orientation to the first electrode 316.

The grip switch 104(3) also includes a spacer foam 320. The spacer foam 320 may be formed from electrically non-conductive materials. The spacer foam 320 is characterized by resilience and is disposed so as to bias the first electrode 316 and the second electrode 318 apart from each other. Respective air gaps 322 are present between the electrodes 316 and 318 when the grip switch 104(3) is in a resting, non-actuated state. The spacer foam 320 is also configured to be squeezed or compressed under the influence of a user applied force 208 such that the electrodes 316 and 318 make electrical contact with each other. The spacer foam 320 is further configured to expand back to the resting condition when the user applied force 208 is removed such that the electrodes 316 and 318 are biased out of electrical contact with each other.

The grip switch 104(3) further includes a flexible shell 324 disposed about the first electrode 316, the second electrode 318 and the spacer foam 320. The flexible shell 324 may be formed from synthetic rubber or another suitable electrically non-conductive material. The flexible shell 324 may also be configured to provide a non-slip gripping surface (e.g., 306), as well.

The grip switch module 108 may be electrically connected to the first electrode 316 and the second electrode 318, respectively, by way of lead wires or other conductive elements. The grip switch module 108 may be configured to assert or not assert the activation signal 206 in accordance with a contacting or non-contacting state of the electrodes 302 and 304. The activation signal 206 may therefore communicate on/off type signaling based on whether or not the user 106 is grasping the grip switch 104(3).

Figure 4:
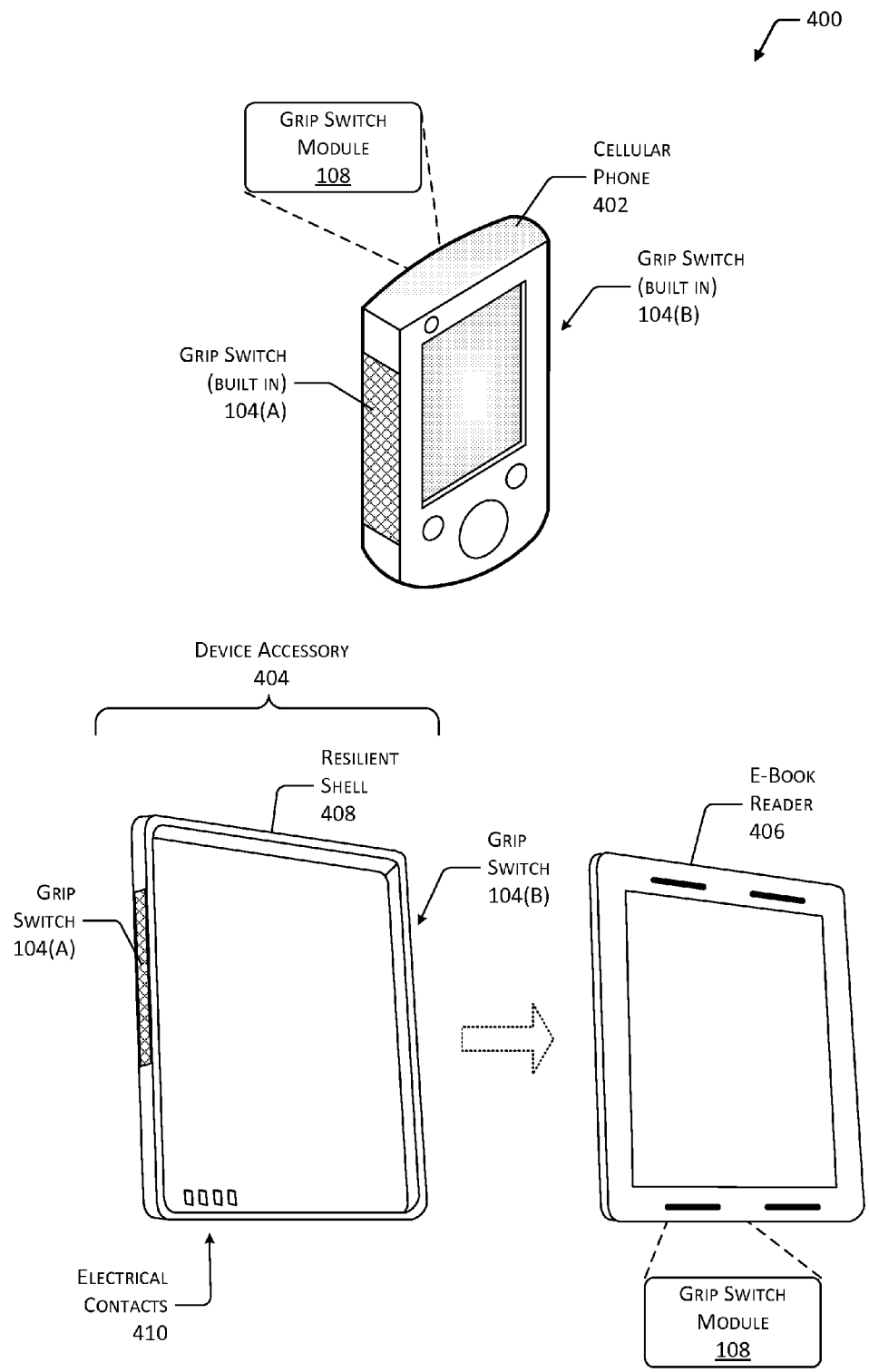
FIG. 4 illustrates a cellular telephone and a device accessory having respective grip switches according to another implementation.

FIG. 4 depicts views 400 of various devices according to respective implementations. The views 400 are illustrative and non-limiting in nature. Other implementations and variations may also be used.

A cellular phone 402 is depicted, including respective grip switches 104(A) and 104(B) disposed on opposite sides thereof. The cellular phone 402 also includes the grip switch module 108, or its analog, configured to provide signaling in accordance with an actuated or gripped state of the grip switches 104(A) and 104(B). In one instance, the grip switch module 108 asserts the activation signal 206 based on whether or not the user 106 is holding the cellular phone 402 in hand, thus actuating either or both of the grip switches 104(A) or 104(B). In another instance, the grip switch module 108 modulates or encodes information within the activation signal 206 based on a relative gripping force or squeeze-type gesturing applied to the grip switches 104(A)-104(B). Other information or formatting may be used with the activation signal 206.

In turn, the cellular phone 402 may be configured to respond to signaling from the grip switch module 108 by transitioning from a low-power, inactive state to higher-power, active state. For instance, the cellular phone 402 may "wake up" and present a user interface to the user 106 in response to the activation signal 206. The cellular phone 402 may therefore be activated and ready for use without need to actuate additional devices, apply input gesturing to a display, and so on, after taking the cellular phone 402 in hand.

The respective grip switches 104(A) and 104(B) are built in features of the cellular phone 402 as depicted and described above. Similar grip switch 104 features may be incorporated into a wide range of other devices, as well. Moreover, one or more grip switches 104 may be added to an existing cellular phone 402 or other device by way of an appropriate accessory item.

A device accessory 404 is also depicted, specifically configured for removable engagement and use with an e-book reader 406. However, numerous other device accessories may be configured and equipped for use with other devices, accordingly. The device accessory 404 includes a resilient shell 408, which may be formed from synthetic rubber or another pliable, electrically non-conductive material. The resilient shell 408 has a form-factor and resilient character so as to be closely fitted over a back and side surfaces of the e-book reader 406 in a jacket-like manner. The device accessory 404 is removable from the e-book reader 406 by virtue of the pliable nature of the resilient shell 408. Thus, the user 106 may install or remove the device accessory 404 at will.

The device accessory 404 also includes respective grip switches 104(A) and 104(B). The grip switches 104(A) and 104(B) are disposed and supported on opposite side surfaces of the resilient shell 408. The grip switches 104(A) and 104(B) are also electrically connected to respective electrical contacts 410 borne on an inside surface of the resilient shell 408. Corresponding electrical contacts of the e-book reader 406 are configured such that an associated grip switch module 108 is in electrical communication with the grip switches 104(A) and 104(B) when the device accessory 404 is engaged with (i.e., installed on, or fitted to) the e-book reader 406.

User applied force 208 to either the grip switch 104(A) or 104(B), or both, is sensed by the grip switch module 108 of the e-book reader 406. The grip switch module 108 may provide an activation signal 206 to a controller 122 or other resource of the e-book reader 406, such that inactive-to-active state transitioning may be performed, respective functions may be selected or initiated, and so forth. It is noted that the resilient shell 408 is configured to cover a back, sides, and end portions of the e-book reader 406 such that a portion or portions of the e-book reader 406 remain exposed for user 106 access thereto. Thus, a display, one or more user input devices, or other features of the e-book reader 406 are readily accessible to the user 106 while the device accessory 404 is removably engaged therewith.

Figure 5:
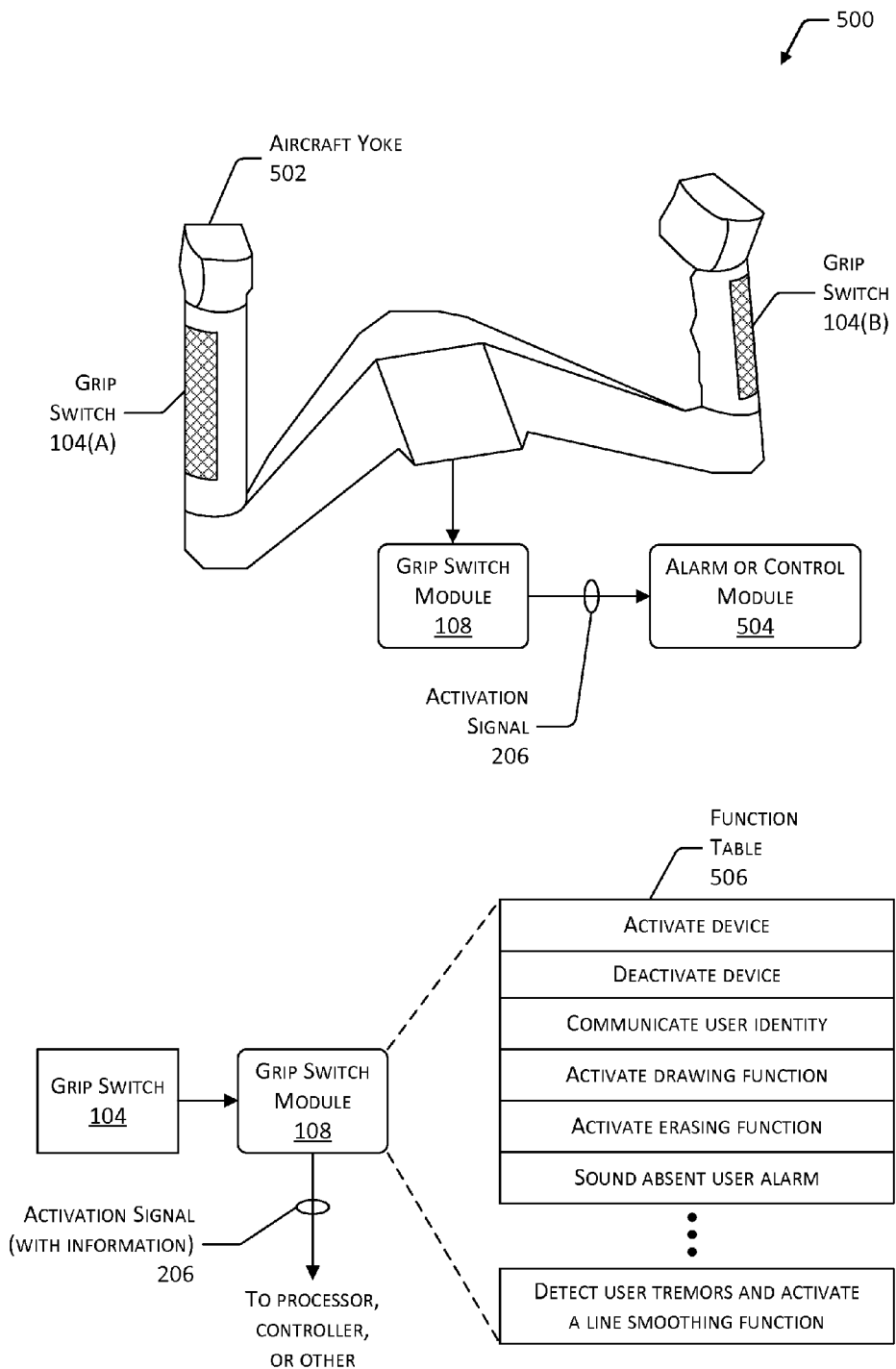
FIG. 5 illustrates an aircraft yoke including grip switches and operations triggered or selectable by way of force input to a grip switch according to another implementation.

FIG. 5 depicts views 500 including an aircraft yoke 502 and other elements according to respective implementations. The views 500 are illustrative and non-limiting in nature. Other implementations and variations may also be used. The aircraft yoke 502 and the associated description below are illustrative of numerous different configurations or functions that may be used in regard to operating a railroad engine or marine vessel, monitoring or controlling an industrial process, supervising or performing a life safety-related function, or various other endeavors.

For example, an amusement park ride, the hand grips of a walker or wheelchair, or another device or situation may call for continuous, two-handed gripping by the user 106 in the interest of personal safety or the safety of another. In another example, one or more grip switches 104 may be implemented as part of a shut-off, run-enable, or other safety feature of a lawn mower, recreational watercraft, snowmobile, or other vehicle. Respective grip switches 104, grip switch modules 108, or other devices may be implemented in these or other scenarios.

The aircraft yoke 502 is configured to receive input from the user 106 during normal operation of an aircraft. Respective grip switches 104(A) and 104(B) are disposed on opposite handholds of the aircraft yoke 502. The grip switches 104(A) and 104(B) are each connected in electrical communication with a grip switch module 108. In one scenario, the grip switch module 108 is configured to provide, or assert, an activation signal 206 in the event that neither the grip switch 104(A) nor 104(B) is being grasped by a user 106 during normal flight operations. Various information may also be communicated by way of the activation signal 206 based on user 106 gripping force applied to the grip switches 104(A) or 104(B), in accordance with which grip switch 104(A) or 104(B) is being grasped, and so forth.

An alarm or control module 504 is also provided and may include a processor or microcontroller, an ASIC, electronic circuitry, executable program code stored on CRSM, or other constituency. The alarm or control module 504 may be configured to perform one or more actions based on the activation signal 206 or information encoded therein.

In one example, the grip switch module 108 and the alarm or control module 504 are respectively configured to determine if the user 106 has at least one hand grasping the aircraft yoke 502. In the event that the user 106 lets go of the aircraft yoke 502 completely, such that neither of the grip switches 104(A) or 104(B) is actuated, the grip switch module 108 un-asserts the activation signal 206 or changes information communicated therein.

In the present example, the alarm or control module 504 then initiates a timing function or "watchdog timer"—for example, of 10 seconds duration—in response to the present state of the activation signal 206. If the timing function elapses without the user 106 resuming a grip on the aircraft yoke 502, the alarm or control module 504 sounds an audible alarm, records corresponding information within an electronic flight log, or performs other steps.

In another example, a grip switch 104 is provided as part of a throttle control on a railroad engine. A watchdog timer is triggered by the activation signal 206 if the user 106 releases grip of the throttle control as sensed by the associated grip switch 104. If the timing function elapses—for example, 20 seconds—without the user 106 grasping the throttle control, the alarm or control module 504 performs a controlled stop of the railroad engine, sounds an audible alarm, transmits related information by radio signal, or performs other operations. Various operations may be performed in response to the user 106 grasp, or absence of grasp, of a grip switch 104. The foregoing "dead man's switch" applications are just a few of numerous implementations.

As depicted, an electrical characteristic of a grip switch 104, such as open/closed contacts, varying electrical resistance, capacitance, or inductance, a piezoelectric response, and so forth, is sensed by a grip switch module 108. The grip switch module 108 may include or have access to a function table 506 stored in CRSM that includes various predefined operations or functions associated with sensed conditions of the grip switch 104.

The grip switch module 108 may communicate a request or instruction to perform specific ones of these operations by way of the activation signal 206. A processor 110, controller 122, or another device or system may be configured to respond and perform actions accordingly. The particular operations depicted in the function table 506 are illustrative and non-limiting, and other suitable operations or steps may also be performed. For example, the operations may include transitioning from a first energy consuming state to another, activating a device, deactivating a device, communicating user identity, generating an alarm indicating absence of a user, detecting hand-tremors from the user and activating a line smoothing function, and so forth.

Additional operations may be activated in response to a predefined event. This predefined event may include expiration of a timer, receipt of other input, completion of another operation, and so forth. For example, a timer may be configured such that five seconds after the grip switch 104 is opened the processor or other electronic circuitry is configured to transition to a low power mode, or deactivate completely.

Figure 6:
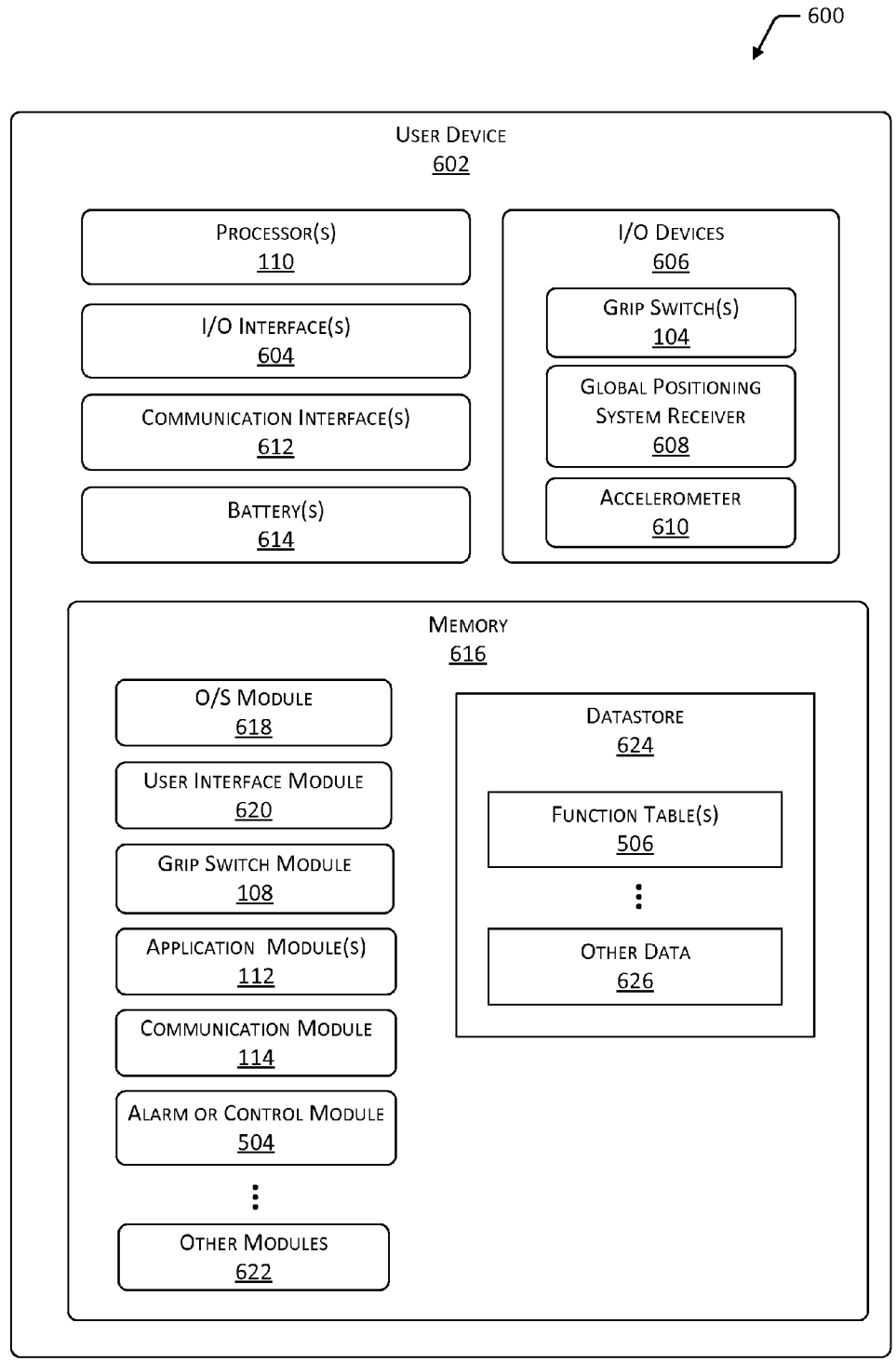
FIG. 6 is a block diagram depicting a user device.

FIG. 6 illustrates a block diagram 600 of a user device 602. The user device 602 is illustrative and non-limiting, and may be defined by a tablet computer 118, a wearable computer, an e-book reader 406, a media device, a cellular phone 402, or another suitable apparatus. The user device 602 may include one or more processors 110 configured to execute one or more stored instructions. The processor(s) 110 may comprise one or more cores.

The user device 602 may include one or more I/O interface(s) 604 to allow the processor(s) 110 or other portions of the user device 602 to communicate with the stylus device 102 or 130, various user devices 602, other computing devices, web-based resources, and so on. The I/O interfaces 604 may comprise I2C, SPI, USB, RS-232, and so forth.

The I/O interface(s) 604 may couple to one or more I/O devices 606. The I/O devices 606 may include one or more input devices such as one or more grip switches 104, a global positioning system (GPS) receiver 608, a keyboard, mouse, and so forth. The I/O devices 606 may also include output devices such as one or more of an accelerometer 610, a display, audio speakers, haptic output devices, and so forth. In some embodiments, the I/O devices 606 may be physically incorporated within the user device 602, or they may be externally placed.

The user device 602 may also include one or more communication interfaces 612. The communication interfaces 612 are configured to provide communications between the user device 602 and other user devices 602, web-based resources, routers, access points, and so forth. The communication interfaces 612 may include wireless functions, devices configured to couple to one or more networks including PANs, LANs, WLANs, WANs, and so forth.

The user device 602 may also include one or more batteries 614 for providing electrical power during normal operations. The battery or batteries 614 may be rechargeable or disposable in nature. Other portable energy sources such as photovoltaic cells, and so forth, may also be used. The user device 602 may also include one or more busses or other internal communications hardware or software that allow for the transfer of data between the various modules and components of the user device 602.

The user device 602 includes one or more memories 616. The memory 616 comprises one or more computer-readable storage media (CRSM). The memory 616 provides storage of computer readable instructions, data structures, program modules and other data for the operation of the user device 602. The memory 616 may include at least one operating system (OS) module 618. Respective OS modules 618 are configured to manage hardware devices such as the I/O interfaces 604, the I/O devices 606, the communication interfaces 612, and provide various services to applications or modules executing on the processors 110.

Also stored in the memory 616 may be one or more of the following modules. These modules may be executed as foreground applications, background tasks, and so forth. A user interface module 620 may be configured to provide one or more application programming interfaces. The user interface module 620 may be configured to operate with information encoded as hypertext markup language ("HTML") files, extensible markup language ("XML") files, or in another suitable format or language. The user interface module 620 is configured to accept inputs and send outputs using the I/O interfaces 604, the communication interfaces 612, or both.

The memory 616 may also store the grip switch module 108, and one or more of the application modules 112, as respectively described above. Non-limiting examples of the applications modules 112 include a word processing application, a spreadsheet application, a technical drawing or illustrating application, a digital photograph viewing or editing application, and so on.

The memory 616 may further store the communication module 114 such that wireless signaling 116 may be communicated to and from the use device 602. Additionally, the alarm or control module 504 may be stored within the memory 616, as well. The memory 616 may also include one or more other modules 622. Non-limiting examples of the other modules 622 include cellular communications circuitry, a watchdog or other timer, a radio receiver, and so forth.

The memory 616 may also include a datastore 624 to store information. The datastore 624 may use a flat file, database, linked list, tree, executable code, or other data structure to store the information. In some implementations, the datastore 624 or a portion of the datastore 624 may be distributed across one or more other user devices 602 or computing devices including servers, network attached storage apparatus, and so forth.

The datastore 624 may store one or more function tables 506. In one instance, a particular functions table 506 is associated with one or more functions performed by way of a particular application module 112. For example, a function table 506 may include instructions communicated from the grip switch module 108 to the processor(s) 110 while a graphics design application is running. Such a function table 506 may enable the user 106 to select different operations by way of input forces, squeeze-type gesturing, and the like, by way of the one or more grip switches 104. The datastore 624 may also store other data 626. For example, the other data 626 may include one or more data structures that may be queried, modified, amended, and so forth.

Figure 7:
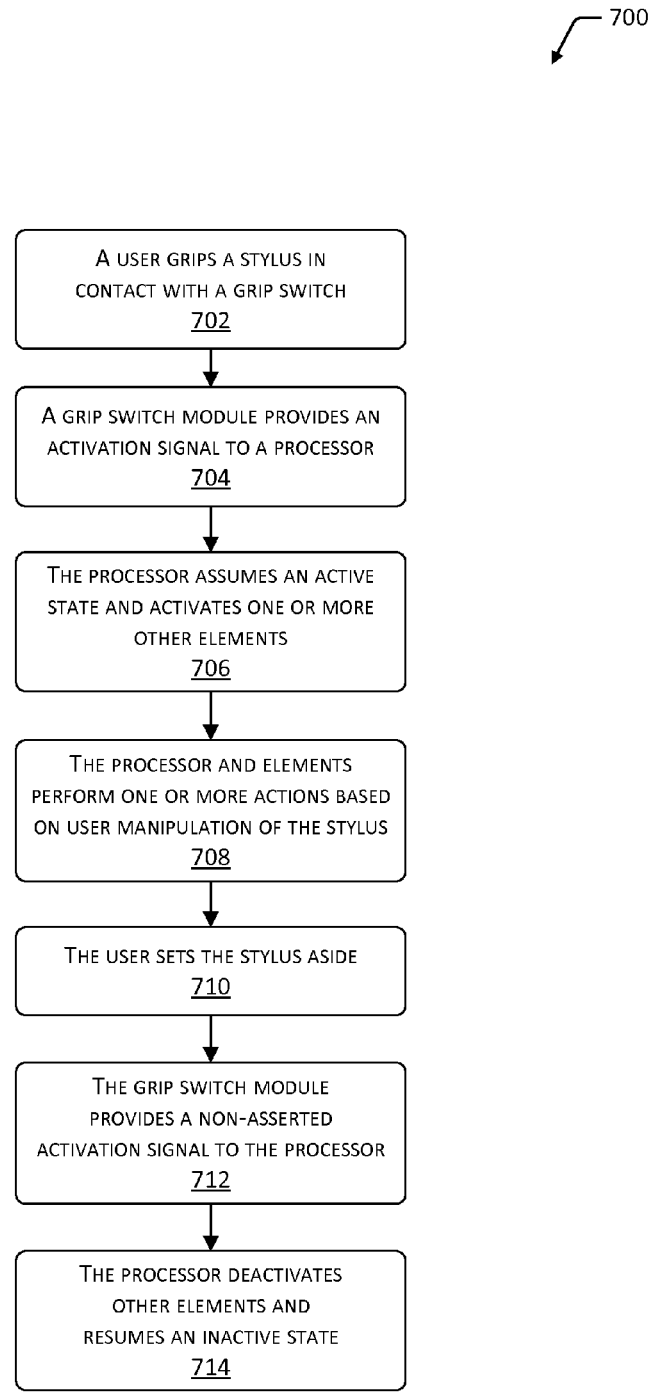
FIG. 7 is a flow diagram of an illustrative process of activating and using a stylus by way of a grip switch.

FIG. 7 is a flow diagram 700 illustrating a process including activation and use of a stylus 102 by way of a grip switch 104. In one non-limiting example, this process may be implemented by way of the stylus 102 and the tablet computer 118. The process of the flow diagram 700 is illustrative and non-limiting, and other processes including one or more other steps, omitting one or more of the depicted steps, or proceeding in other orders of execution, may also be used.

At block 702, a user 106 grips a stylus 102 such that at least a portion of their hand comes in contact with a grip switch 104. For purposes of a present example, the user 106 takes the stylus 102 in hand, such that the thumb and forefinger of the user 106 result in a user applied force 208 to the grip switch 104.

At block 704, a grip switch module 108 provides an activation signal 206 to a processor 110. In the present example, the grip switch 104 changes an electrical characteristic in response to the user 106 gripping force applied thereto. For instance, a first electrode 202 and a second electrode 204 are flexed into electrical contact with each other. This closed contact condition is sensed by the grip switch module 108, and an activation signal 206 is asserted in response. The asserted activation signal 206 is communicated to the processor 110.

At block 706, the processor 110 assumes an active state and activates one or more other elements. In the present example, the processor 110 transitions from a power conserving inactive state, to a full-power active state, in response to the asserted activation signal 206. In turn, the processor 110 signals the communication module 114 to assume an active state or condition as well, in preparation for normal operations of the stylus 102.

At block 708, one or more actions by the processor 110 are performed based on user 106 manipulation of the stylus 102. In the present example, the processor 110 initiates an application module 112 such that movements of the stylus 102 are encoded as a data stream and provided to the communication module 114. The communications module 114 communicates this movement information to the tablet computer 118 using the wireless signaling 116. In turn, the tablet computer 118 initiates a drawing application, and presents line segments, arcs, or other indicia on the display 120 in accordance with the user 106 movement of the stylus 102.

At block 710, the user 106 sets the stylus 102 aside. In the present example, the user 106 sets the stylus 102 aside, such that the grip switch 104 is no longer actuated by a user applied force 208.

At block 712 a non-asserted activation signal 206 from the grip switch module 108 is provided to the processor 110. In the present example, the grip switch module 108 unasserts the activation signal 206 being provided to the processor 110, in response to sensing the non-gripped condition of the grip switch 104.

At block 714, the processor 110 deactivates other elements and resumes an inactive state. In the present example, the processor 110 responds to the un-asserted condition of the activation signal 206 by signaling the communication module 114 to return to a low-power, inactive state. Thus, the wireless signaling 116 ceases, as well. The processor 110 then resumes the power conserving inactive state, such that electrical power consumption by the stylus 102 as a whole is reduced accordingly.

Figure 8:
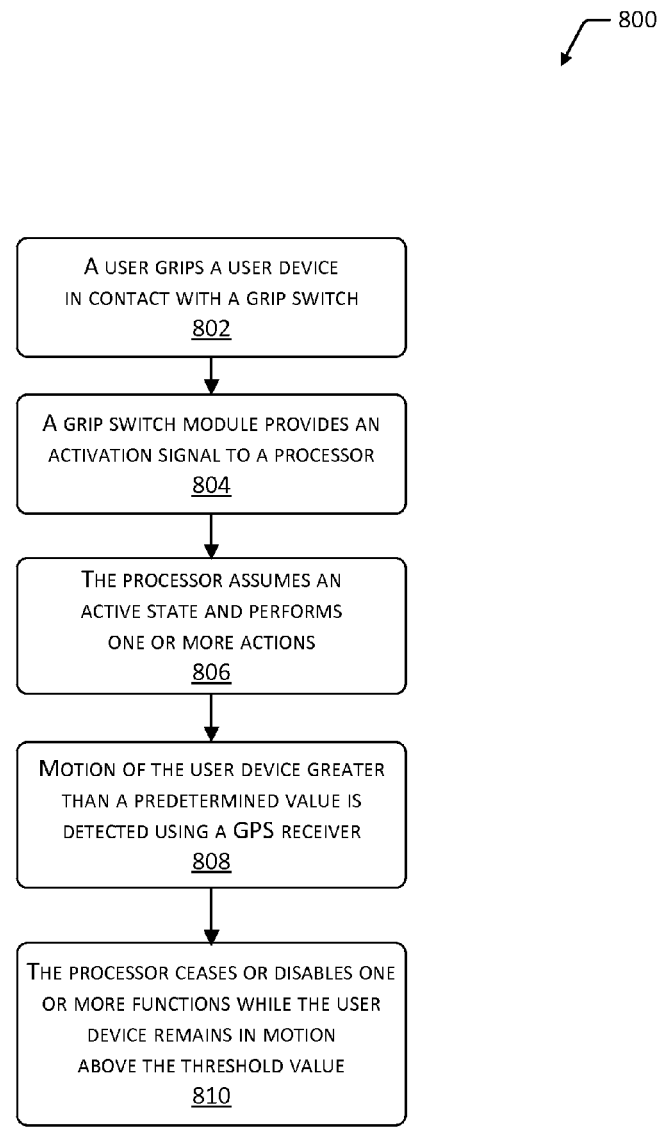
FIG. 8 is a flow diagram of an illustrative process of activating and disabling functions of a user device based on detected motion and actuation of a grip switch.

FIG. 8 is a flow diagram 800 illustrating a process including the activation and use of a user device 602 by way of a grip switch 104. In one non-limiting example, this process may be implemented by way of the user device 602. The process of the flow diagram 800 is illustrative and non-limiting, and other processes including one or more other steps, omitting one or more of the depicted steps, or proceeding in other orders of execution, may also be used.

At block 802, a user 106 grips a user device 602 such that the grip of their fingers is in contact with a grip switch 104. For purposes of a present example, the user device 602 may have communication capabilities. As a result of holding or gripping the user device 602, user applied force 208 activates the grip switch 104.

At block 804, a grip switch module 108 provides an activation signal 206 to a processor 110 based on the user applied force 208 to the grip switch 104. In the present example, the grip switch 104 changes an electrical characteristic in response to the user 106 gripping force. For instance, first and second electrodes 202 and 204, respectively, are brought into electrical contact with each other. This closed contact condition is sensed by the grip switch module 108, and an activation signal 206 is asserted in response. For example, as described above, the grip switch module 108 may detect between the electrodes 202 and 204 a presence of (or change in) one or more of voltage, resistance, capacitance, or inductance across the electrodes 202-204. The asserted activation signal 206 is communicated to the processor 110.

At block 806, the processor 110 assumes an active state and performs one or more actions. In the present example, the processor 110 transitions from a power conserving inactive state, to a full-power active state, in response to the asserted activation signal 206. In turn, the processor 110 initiates a cellular communications mode, and presents a user interface including a virtual telephone keypad to the user 106. The user 106 provides input to the user interface so as to place a cellular telephone call.

At block 808 motion of the user device 602 that is greater than a predetermined value is detected using a GPS receiver 608. In the present example, the user 106 enters an automobile and begins driving in highway traffic after initiating the cellular telephone call. The processor 110 receives motion or velocity related information from the GPS receiver 608 and determines that the user device 602 is presently moving at greater than ten miles-per-hour (MPH), a predetermined threshold value. Thus, the user device 602 "assumes" that the user 106 may be driving an automobile while conducting the cellular telephone call—a safety concern, and perhaps an illegal act in the present jurisdiction. In another instance, other devices or a combination of techniques may be used to measure user device 602 motion or velocity, such as the accelerometer 610, triangulation of cellular tower signals, and so on.

At block 810, the processor 110 ceases or disables one or more functions while the user device 602 remains in motion above the threshold value. In the present example, the processor 110 causes the user device 602 to end the cellular telephone call that is presently in progress. Furthermore, the processor 110 disables cellular communication functionality while the measured velocity of the user device 602 remains greater than ten MPH. Other safety related operations or functions may also be performed or disabled based on measured velocity, geographic location, time of day, user 106 identity, and so on.

In another implementation, the processor 110 does not cease or disable cellular functionality, but rather presents an alert message to the user 106 such as "Do not place cellular calls while operating a motor vehicle or other potentially hazardous equipment." The processor 110 may also be present with the user 106 with an input option such as "OK" or "EXIT" so as to remove the alert message. This way, non-operator passengers in an automobile are not prevented from using cellular communications functions of the user device 602 while in transit.

Figure 9:
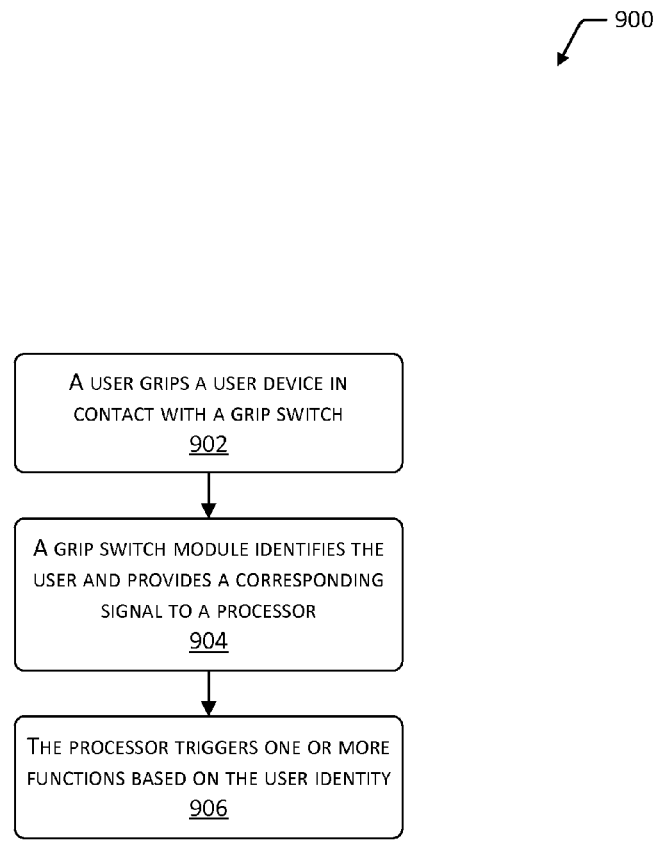
FIG. 9 is a flow diagram of an illustrative process of identifying a user based on input to a grip switch and triggering respective functions accordingly.

FIG. 9 is a flow diagram 900 illustrating a process including the use of a user device 602 by way of a grip switch 104. In some implementations, this process may be implemented by way of the user device 602. The process of the flow diagram 900 is illustrative and non-limiting, and other processes including one or more other steps, omitting one or more of the depicted steps, or proceeding in other orders of execution, may also be used.

At block 902, a user 106 grips a user device 602 such that at least a portion of their hand is in contact with a grip switch 104. For purposes of a present example, the user device 602 may include e-book reader functionality. The user device 602 also includes a device accessory 404 that is engaged therewith. The user 106 takes the user device 602 in hand, such that a user applied force 208 is incident to a grip switch 104 of the device accessory 404.

At block 904, a grip switch module 108 identifies the user 106 and provides a corresponding signal to a processor 110. Identification of the user 106 may comprise a determination as to a particular user name, account identifier, login, and so forth of the user 106 who is gripping the user device 602. In the present example, the grip switch module 108 measures a grip pressure or force exerted by the user 106 based on a resistance value exhibited by the grip switch 104. For instance, the grip switch 104 may be analogous to the grip switch 104(2). The grip switch module 108 identifies a particular user 106 based on the gripping force and communicates identity information to the processor 110 by way of the activation signal 206. The user applied force 208 may be determined at a particular instant, sampled over time, and so forth. For example, an initial user applied force 208 may be indicative of the identity of the user 106. In another example, a profile of the user applied force 208 over time may be indicative of the identity of the user 106.

At block 906, the processor 110 triggers one or more functions based on the identity of the user 106. In the present example, the processor 110 initiates one or more application modules 112 based on the user 106 identity encoded in the activation signal 206. For instance, the processor 110 may access a specific e-book, presenting a particular page on the display 120 where the identified user 106 left off during a recent reading session. Other operations or actions may also be initiated or performed based on the user 106 identity.

Those having ordinary skill in the art will readily recognize that certain components, steps, or operations illustrated in in the figures above can be eliminated, taken in an alternate order, or otherwise rearranged. Moreover, the methods described above may be implemented as one or more software programs for a computer system and are encoded in a computer-readable storage medium as instructions executable on one or more processors.

The computer-readable storage medium (CRSM) can be any one of an electronic storage medium, a magnetic storage medium, an optical storage medium, a quantum storage medium and so forth. Separate instances of these programs can be executed on or distributed across separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments and situations.

Although the present disclosure is written with respect to specific embodiments and implementations, various changes and modifications may be suggested to one skilled in the art and it is intended that the present disclosure encompass such changes and modifications that fall within the scope of the appended claims.

What is claimed is:

1. A stylus, comprising:
a grip switch configured to exhibit a change in an electrical resistance in response to an applied force input, the grip switch comprising:
   a spacer formed from a compressible material;
   a first electrode positioned external to the spacer and having an internal surface associated with the spacer; and
   a second electrode positioned external to the spacer and having an internal surface associated with the spacer, wherein the second electrode is spaced apart from the first electrode to define a gap between the first electrode and the second electrode, and wherein compression of the spacer under the applied force input moves one or more of the first electrode or the second electrode to narrow a width of the gap and provide an electrical connection between the first electrode and the second electrode;
a grip switch module coupled to the grip switch and configured to provide a first signal in response to the change in the electrical resistance between the first electrode and the second electrode of the grip switch;
a processor coupled to the grip switch and the grip switch module and configured to transition from a first state to a second state in response to the first signal, wherein the processor is configured to provide information indicative of one or more of a position or a movement of the stylus during operation in the second state, and wherein the processor is further configured to consume less electrical energy in the first state than in the second state; and
a transmitter configured to communicate the information to an external device using electronic signals, wherein the transmitter transitions between an inactive state and an active state in response to a second signal provided by the processor.

2. The stylus of claim 1, wherein the first electrode and the second electrode are respectively defined by partial cylindrical form factors having an internal surface and an external surface, at least a portion of the internal surface of the first electrode and at least a portion of the internal surface of the second electrode contact the spacer, and the applied force input to the external surface of one or more of the first electrode or the second electrode compresses the spacer.

3. The stylus of claim 1, wherein the grip switch module is further configured to provide the first signal based on comparing the change in the electrical resistance of the electrical connection between the first electrode and the second electrode with a predetermined threshold value.

4. A device, comprising:
a grip switch including:
   a core;
   at least two electrically conductive members external to the core and separated by at least one gap, wherein an applied force compresses the core and moves at least one of the at least two electrically conductive members into contact with at least one other of the at least two electrically conductive members; and
   electronic circuitry configured to:
      detect the change in an electrical characteristic of the at least one of the at least two electrically conductive members;
      generate and encode information within a digital signal based on the detected change in the electrical characteristic; and
      transition between a first energy consuming state and a second energy consuming state in accordance with the encoded information.

5. The device of claim 4, wherein the at least one of the at least two electrically conductive members includes an electrically conductive foam having the electrical resistance that varies in accordance with the applied force, and wherein the electronic circuitry is further configured to encode information within the digital signal based on the electrical resistance of the electrically conductive foam.

6. The device of claim 4, wherein the electronic circuitry is further configured to sense the electrical characteristic using a biasing signal, and wherein the electronic circuitry is further configured to filter the biasing signal.

7. The device of claim 4, wherein the electronic circuitry is further configured to:
identify a user based on a user applied force to the grip switch;
encode information indicative of a user identity within the digital signal; and
perform one or more predetermined functions associated with the user based on the identity encoded within the digital signal.

8. The device of claim 4, wherein the device is a stylus, and wherein the electronic circuitry is further configured to electronically communicate information to a device external to the stylus, and wherein the information is based on a movement of the stylus while operating in the second energy consuming state.

9. The device of claim 4, wherein the electronic circuitry is further configured to operate in the second energy consuming state while the applied force to the grip switch is in effect.

10. The device of claim 9, wherein the electronic circuitry is further configured, while operating in the second energy consuming state, to:
measure a velocity of the device; and
disable a predetermined function in response to a measured velocity of the device being greater than a predetermined threshold value.

11. The device of claim 4, wherein the grip switch is a first grip switch positioned proximate to a first end of the device, the device further comprising a second grip switch distinct from the first grip switch and positioned proximate to a second end of the device, and wherein the electronic circuitry is further configured to perform a first function associated with the first end in response to a first force input to the first grip switch, and to perform a second function associated with the second end in response to a second force input to the second grip switch.

12. The device of claim 4, wherein the electronic circuitry is further configured to transition from the second energy consuming state back to the first energy consuming state in response to a predefined event.

13. The device of claim 4, the device further comprising:
a resilient shell configured to be engaged to at least a portion of a portable electronic device;
wherein the grip switch is supported by the resilient shell; and
wherein the electronic circuitry is further configured to provide the digital signal to the portable electronic device.

14. A method comprising:
receiving, by a device that includes a spacer and at least two electrically conductive members associated with the spacer and separated by at least one gap, an applied force, wherein the applied force compresses the spacer to cause movement of at least one of the at least two electrically conductive members into contact with at least one other of the at least two electrically conductive members to change an electrical characteristic of the at least two electrically conductive members by enabling electrical conduction between the at least two electrically conductive members;
detecting, by the device, the change in the electrical characteristic;
generating, by the device, a first signal in response to the change in the electrical characteristic; and
transitioning at least a portion of the device from a first state to a second state in response to the first signal.

15. The method of claim 14, wherein movement of the spacer and the at least one of the at least two electrically conductive members moves the at least one of the at least two electrically conductive members into physical contact with at least one other of the at least two electrically conductive members to electrically couple the at least two electrically conductive members.

16. The method of claim 14, wherein the at least two electrically conductive members include electrodes,
and wherein the applied force compresses the spacer and moves the at least one of the at least two electrically conductive members into contact with the at least one other of the at least two electrically conductive members to electrically couple the at least two electrically conductive members.

17. The method of claim 14, wherein the device in the first state consumes less electrical energy than the device in the second state.

18. The method of claim 14, further comprising:
detecting, by the device, discontinuation of the change in the electrical characteristic of the at least one electrically conductive member;
generating, by the device, a second signal in response to the discontinuation of the change in the electrical characteristic; and
transitioning the at least a portion of the device from the second state to the first state in response to the second signal.

19. The method of claim 14, wherein the at least a portion of the device comprises a transmitter; and further comprising sending data using the transmitter, operating in the second state, to one or more external devices.

20. The stylus of claim 1, wherein the first electrode and the second electrode are configured to make electrical contact with each other in response to the applied force input by displacing one or more of the first electrode, the second electrode, or the spacer to cause the first electrode to contact the second electrode; and
further wherein the spacer is configured to expand such that the first electrode and the second electrode break the electrical contact with each other in response to an absence of the applied force input.

* * * * *